US007507153B2

(12) United States Patent
Nara

(10) Patent No.: US 7,507,153 B2
(45) Date of Patent: Mar. 24, 2009

(54) MAHJONG GAME SYSTEM AND MAHJONG RANKING LIST DISPLAY METHOD

(75) Inventor: Toshiomi Nara, Tokyo (JP)

(73) Assignee: Aruze Corporation, Tokyo (JP)

( * ) Notice: Subject to any disclaimer, the term of this patent is extended or adjusted under 35 U.S.C. 154(b) by 668 days.

(21) Appl. No.: 10/882,406

(22) Filed: Jul. 2, 2004

(65) Prior Publication Data

US 2005/0003882 A1 Jan. 6, 2005

(30) Foreign Application Priority Data

Jul. 4, 2003 (JP) ............................ 2003-192404

(51) Int. Cl.
*A63F 13/00* (2006.01)

(52) U.S. Cl. .......................................... 463/13; 463/42

(58) Field of Classification Search .................. 463/13, 463/42; 700/91, 92, 93
See application file for complete search history.

(56) References Cited

U.S. PATENT DOCUMENTS 4,575,798 A * 3/1986 Lindstrom et al. ............. 707/7
5,083,271 A * 1/1992 Thacher et al. ............... 700/92
5,359,510 A * 10/1994 Sabaliauskas ................ 700/91
5,779,549 A * 7/1998 Walker et al. ................. 463/42
6,453,160 B1 9/2002 Thomas et al.
2002/0193162 A1* 12/2002 Walker et al. ................. 463/42

FOREIGN PATENT DOCUMENTS

EP 1 304667 4/2003
JP HEI 4-70089 6/1992
WO WO 01/32276 5/2001

* cited by examiner

*Primary Examiner*—Corbett Coburn
*Assistant Examiner*—Joshua P. Wert
(74) *Attorney, Agent, or Firm*—Oliff & Berridge, PLC

(57) ABSTRACT

In a mahjong game system constituted by a mahjong game machine and an information processing device, the information processing device comprises: game data reception means for receiving game data; game data storage means; ranking criterion setting means for setting a ranking criterion during the creation of a ranking list at predetermined time intervals based on the game data; ranking means for creating, on the basis of the ranking criterion, a ranking list based on the stored game data; and ranking data transmitting means for transmitting the ranked ranking data to the mahjong game machine.

10 Claims, 16 Drawing Sheets

MAHJONG GAME SYSTEM AND MAHJONG RANKING LIST DISPLAY METHOD

RELATED APPLICATIONS

This application claims the priority of Japanese Patent Application No. 2003-192404 filed on Jul. 4, 2003, which is incorporated herein by reference.

Further, this application is related to Japanese Patent Application Nos. 2003-192398, 2003-192399, 2003-271136, 2003-271138, 2003-271140, 2003-271141 and 2003-192406, which were filed with the Japanese Patent Office on Jul. 4, 2003, respectively.

BACKGROUND OF THE INVENTION

1. Field of the Invention

The present invention relates to a mahjong game system comprising a plurality of mahjong game machines and an information processing device, and a mahjong ranking list display method used in this mahjong game system and the like.

2. Description of the Prior Art

Mahjong game machines which provide a two-player mahjong game to be played against an opponent character have been known (see, for example, Japanese Unexamined Utility Model Publication No. HEI 4-70089). In such a mahjong game machine, an image depicting a mahjong table is displayed on a display device together with images indicating a player's own tiles and discarded tiles, an opponent character's discarded tiles, and so on. A mahjong game proceeds in a format whereby the player and opponent character repeatedly draw and discard tiles in accordance with operations and the like by the player. The player assembles tiles in order to complete a hand, and when the hand is completed earlier than that of the opponent character, the player can obtain points from the opponent character corresponding to the form in which the hand is completed by the combination of tiles. If the player beats the opponent character by reducing the opponent character's score to zero or the like, an attraction such as having the opponent character praise the mahjong skill of the player is presented on the display device, for example.

However, in the mahjong game machine described above, games are always played against the same opponent character, and hence the mahjong game becomes boring if it is played many times.

Moreover, although a ranking list may be created on the basis of the game data, a ranking list that is always based on the same criterion becomes monotonous, making it difficult to maintain the desire to continue playing the mahjong game over a long period.

SUMMARY OF THE INVENTION

The present invention has been designed in consideration of the problems described above, and it is an object thereof to provide a mahjong game system in which a rank order, which tends to be fixed, can be provided with fluidity, enabling evaluation of a player's mahjong skills from various perspectives such that the player can sufficiently enjoy playing the mahjong game over a long period without becoming bored, and a mahjong ranking list display method used in this mahjong game system.

To solve the problems described above, the present invention provides the following.

(1) A mahjong game system is constituted by a mahjong game machine (for example, mahjong game machines 10A to 10L) comprising display means (for example, a display device 13) for displaying at least an image of tiles owned by a player and tiles that have been discarded by the player, and an image of tiles that have been discarded by an opponent character serving as an opponent in the game, the mahjong game machine thus providing a two-player mahjong game in which the player plays against a plurality of the opponent characters respectively, and an information processing device (for example, an information processing device 100) which is capable of transmitting and receiving data to and from the mahjong game machine. The information processing device comprises: game data reception means for receiving game data transmitted by the mahjong game machine; game data storage means for storing the game data received by the game data reception means; ranking criterion setting means for setting a ranking criterion at predetermined time intervals during the creation of a ranking list based on the game data; ranking means for creating, on the basis of the ranking criterion set by the ranking criterion setting means, a ranking list based on the game data stored by the game data storage means; and ranking data transmission means for transmitting ranking data ranked by the ranking means to the mahjong game machine (see FIG. 9).

(2) In the mahjong game system described in (1), the ranking criterion setting means select and set a single ranking criterion from among a plurality of ranking criteria by conducting a sampling at predetermined time intervals.

(3) A mahjong ranking list display method for determining, on the basis of a predetermined ranking criterion, a ranking list based on game data of a mahjong game, and displaying the ranking list, comprises the steps of: storing game data generated by a mahjong game machine (for example, the mahjong game machines 10A to 10L) during a game played against an opponent character; transmitting the stored game result data to an information processing device (for example, the information processing device 100); receiving ranking data transmitted by the information processing device; storing the received ranking data; displaying the stored ranking data on display means; receiving the game data transmitted by the mahjong game machine in the information processing device; storing the game data received from the mahjong game machine; setting a ranking criterion at predetermined time intervals during the creation of a ranking list based on the game data; creating, on the basis of the set ranking criterion, a ranking list based on the stored game data; and transmitting the ranked ranking data to the mahjong game machine (see FIG. 9).

(4) The mahjong ranking list display method according to (3), wherein the step of setting a ranking criterion at predetermined time intervals during the creation of a ranking list based on the game data is performed by selecting and setting a single ranking criterion from among a plurality of ranking criteria by conducting a sampling at predetermined time intervals.

DESCRIPTION OF THE PREFERRED EMBODIMENTS

First Embodiment

Embodiments of the present invention will be described on the basis of the drawings.

Figure 1:
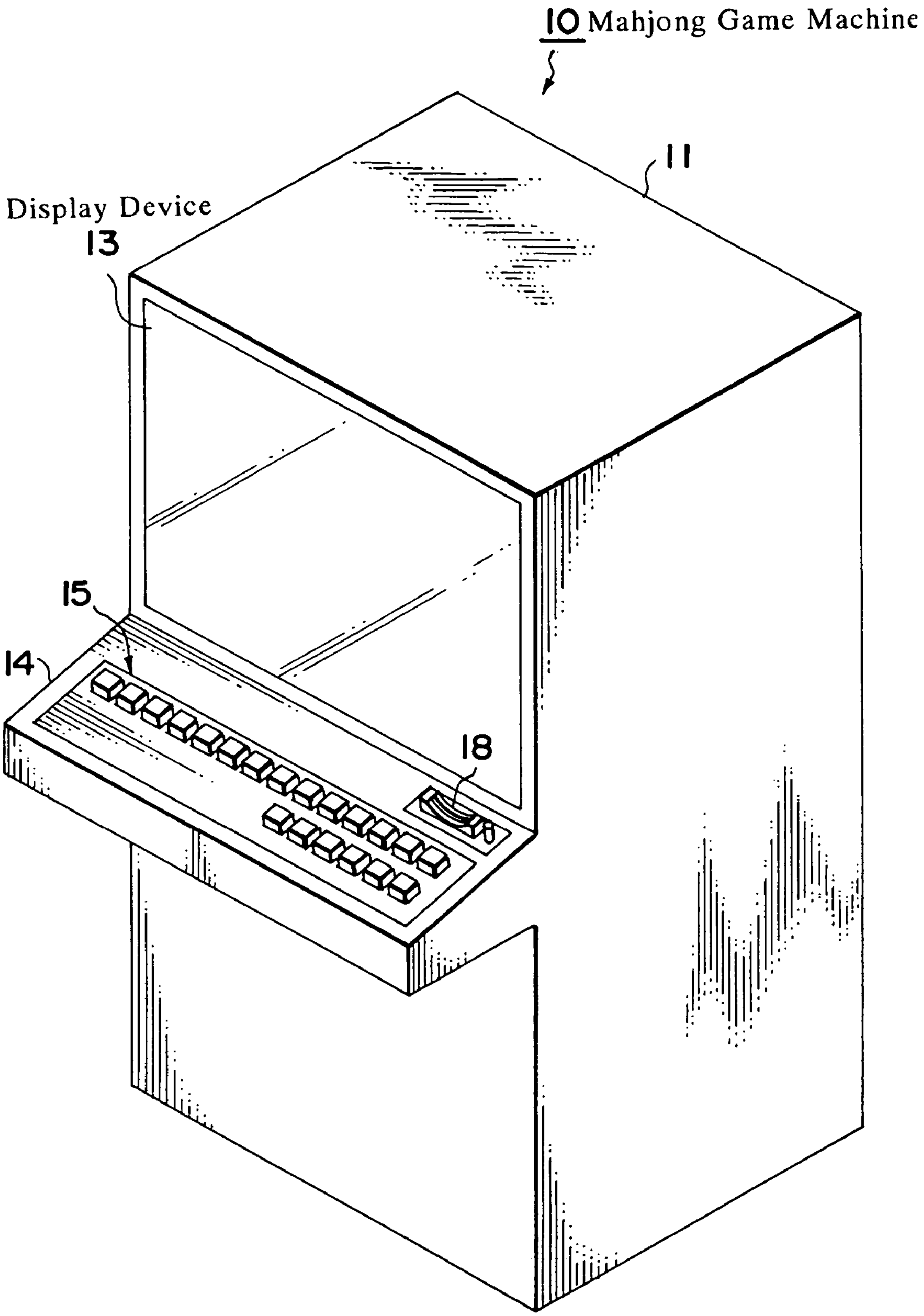
FIG. 1 is a schematic perspective view showing an example of a mahjong game machine according to an embodiment of the present invention.

FIG. 1 is a schematic perspective view showing an example of a mahjong game machine according to a first embodiment. The mahjong game machine shown in FIG. 1 is an arcade gaming machine placed in a so-called game arcade. However, the mahjong game machine in accordance with the present invention encompasses not only arcade gaming machines, but also home gaming machines and portable gaming machines, for example.

A mahjong game machine 10 comprises a longitudinal box-shaped housing 11 with a display device 13 attached to the upper side of the housing 11. The display device 13 displays an image depicting a mahjong table, and images depicting 13 or 14 tiles owned by a player, tiles discarded by the player, tiles owned by an opponent character, which are displayed face down, tiles discarded by the opponent character, and so on. The display device 13 further displays images depicting the opponent characters, or images depicting the opponent characters and the speech of the opponent characters, and so on.

On the lower side of the display device 13, an operating board 14 provided with an operating device 15 is disposed so as to project to the front side. The operating device 15 comprises 14 operating buttons disposed on the rear side of the operating board 14 and 6 operating buttons disposed on the front side thereof. By manipulating the operating buttons of the operating device 15, the player can carry out various operations relating to the mahjong game. The operating device 15 will later be explained in detail with reference to FIG. 2 of the drawings.

At the right end on the rear side of the operating board 14, a coin insertion slot. 18 for inserting a coin necessary for starting the mahjong game is formed.

Figure 2:
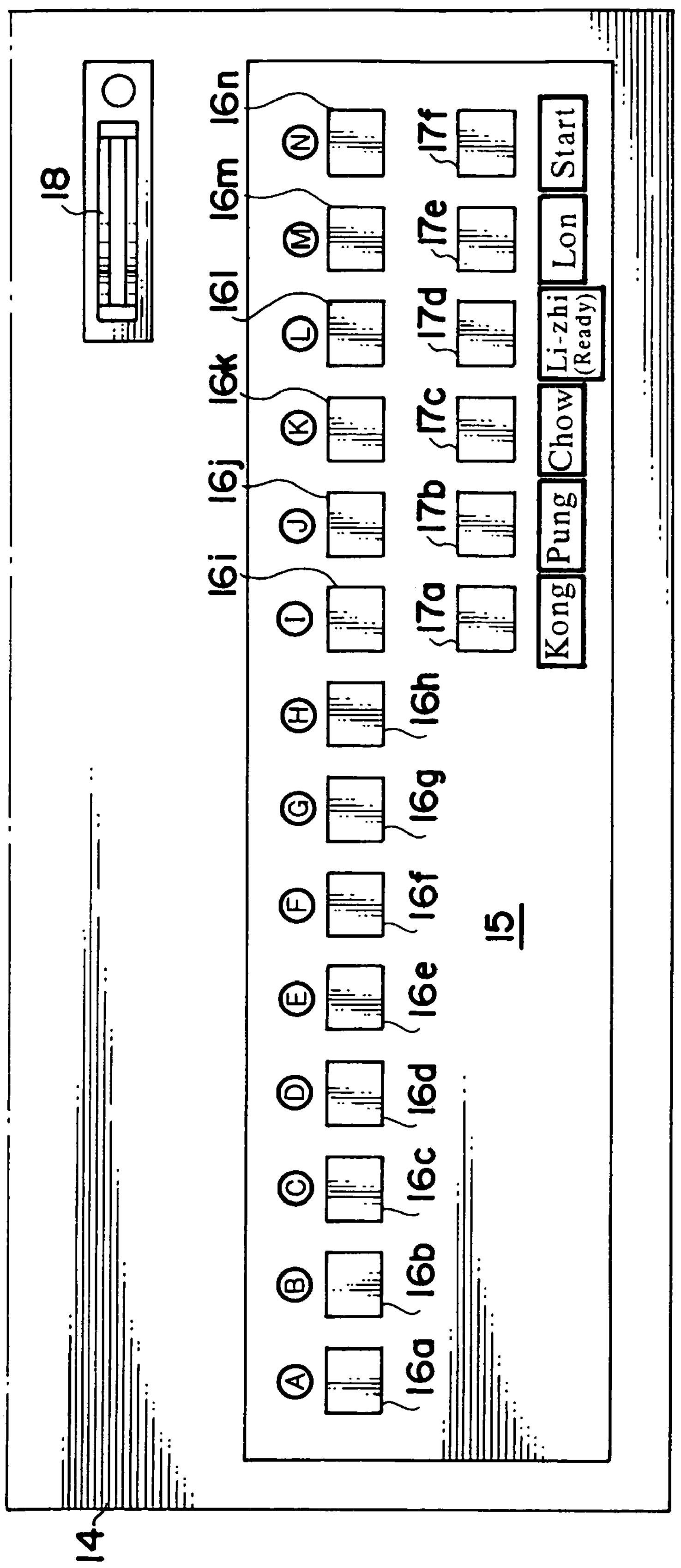
FIG. 2 is a schematic plan view showing an operating board 14 provided in the mahjong game machine shown in FIG. 1.

FIG. 2 is a schematic plan view showing the operating board 14 of the mahjong game machine 10.

As shown in FIG. 2, the operating device 15 in the operating board 14 comprises 14 operating buttons 16 (16*a* to 16*n*) disposed on the upper side (the rear side in FIG. 1) of the operating board 14, and 6 operating buttons 17 (17*a* to 17*f*) disposed on the lower side thereof (the front side in FIG. 1). The coin insertion slot 18 is formed on the upper right side of the 14 operating buttons 16.

The 14 operating buttons 16 (16*a* to 16*n*) correspond respectively to 14 tiles which are those owned by the player displayed on the display device 13. Pushing the operating button 16*n* when the number of tiles owned by the player is 13 draws a tile, thereby displaying a new tile at the right end (the position corresponding to the operating button 16*n*) of the 13 tiles displayed on the display device 13, thus increasing the number of tiles owned by the player to 14. Then, the player chooses 1 unnecessary tile from the 14 tiles owned by the player, and pushes the operating button 16 corresponding to this unnecessary tile so as to discard the tile. As a result, the unnecessary tile is erased from the tiles owned by the player, which reduces the number of tiles owned by the player to 13, whereupon the discarded unnecessary tile is newly displayed in a part of the display device 13 for displaying discarded tiles.

From among the six operating buttons 17 (17*a* to 17*f*), the operating buttons 17*a* to 17*e* correspond respectively to the actions of "Kong", "Pung", "Chow", "Li-zhi (Ready)", and "Lon" in conventional mahjong, whereas the operating button 17*f* is a button pushed for starting the mahjong game after inserting a coin into the coin insertion slot 18.

The operating buttons 16 (16*a* to 16*n*) also double as numeric, hiragana, and alphabetic characters, and by pressing a specific operating button when a screen for selecting certain conditions is displayed, predetermined conditions may be selected, and predetermined text, names, and so on may be inputted.

By operating the operating device 15 comprising the operating buttons 16*a* to 16*n* and 17*a* to 17*f*, the player successively changes the tiles owned thereby. Meanwhile, the opponent character carries out similar actions, which are automatically controlled by a control unit (CPU). Naturally, the tiles of the opponent character are displayed face down so that the player can see only the tiles discarded by the opponent character.

Note that tiles to be discarded or Chow, Pung, and the like may be selected by pressing a plurality of operating buttons for moving a colored part or the like, which indicates the selection, up, down, left, and right on the screen, and by pressing an operating button for discarding the selected tile or executing the selected item. Alternatively, such selections may be performed using a mouse or by touching the screen. The same applies for a case in which a certain condition is selected.

The player and opponent character repeatedly draw and discard tiles in an alternating fashion with actions of "Pung", "Chow", and the like inserted as the case may be. When the tiles owned by the player become a set corresponding to any of a plurality of winning hands (e.g., "Pinghoo" or "Tang Yao"), the player completes the hand, and the points corresponding to the completed hand can be acquired from the opponent character.

When the opponent character wins by completing a hand, by contrast, the points corresponding to the completed hand are acquired by the opponent character, whereby the score of the player decreases.

Although the player successively changes the owned tiles by manipulating the operating buttons in this embodiment, the mahjong game machine of the present invention may be configured such that displays corresponding to the operating buttons are shown on the screen of the display device in order for the above-mentioned operations to be carried out when their corresponding parts are clicked. Alternatively, the machine may be configured such that the above-mentioned operations can be carried out when parts showing tiles are clicked.

Figure 3:
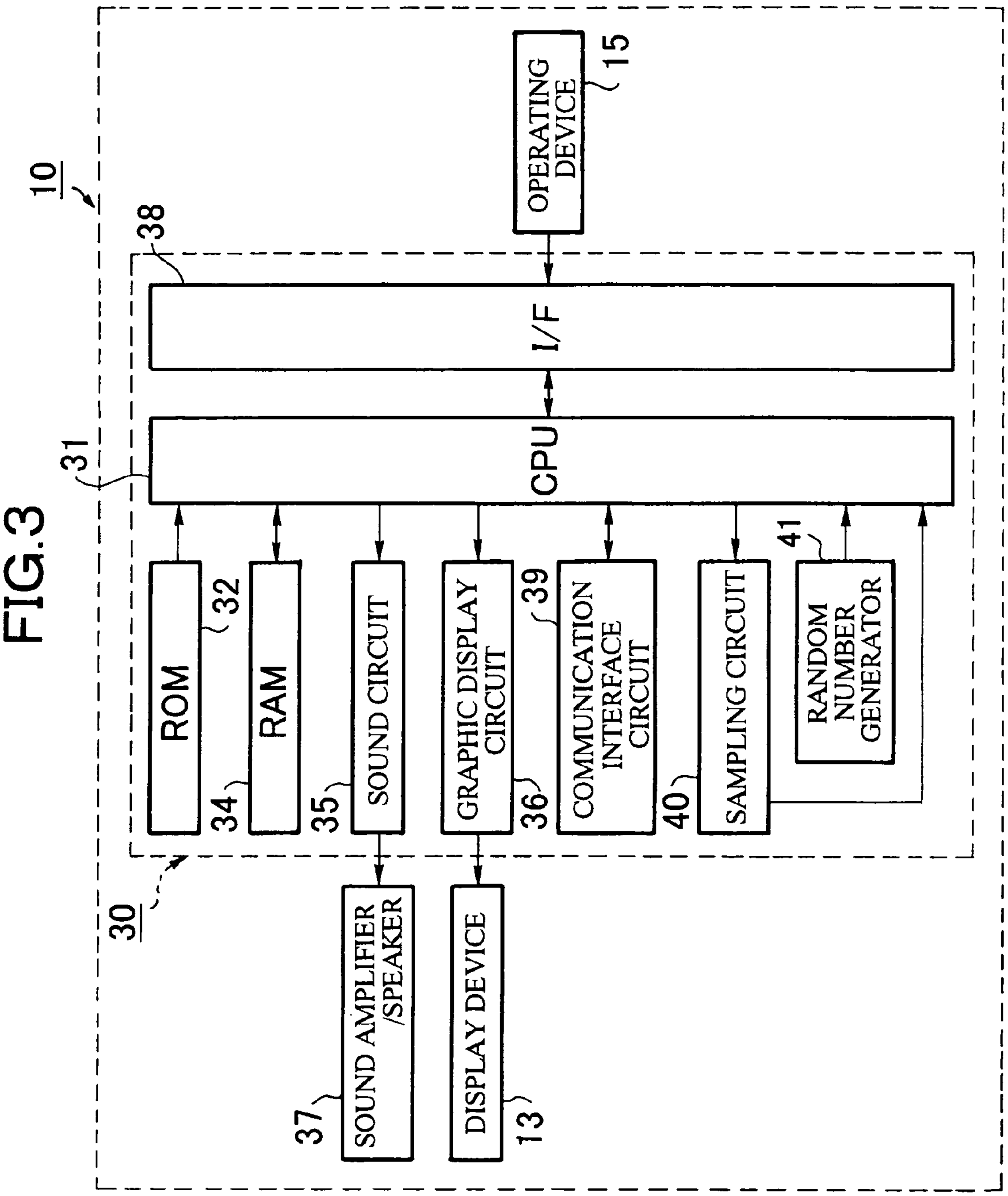
FIG. 3 is a schematic block diagram showing the inner configuration of the mahjong game machine shown in FIG. 1.

FIG. 3 is a block diagram schematically showing the inner configuration of the mahjong game machine 10.

As shown in FIG. 3, a control unit 30 is disposed within the housing 11 of the mahjong game machine 10. The control unit 30 comprises a CPU (central processing unit) 31, a ROM (Read-Only Memory) 32, and a RAM (Random Access Memory) 34.

The CPU 31 is connected to the operating device 15 by way of an interface circuit (I/F) 38. By carrying out various processes according to control signals from the operating device 15, the CPU 31 advances the mahjong game.

The ROM 32 stores various kinds of image data, such as image data for the tiles and opponent characters displayed on the display device 13, and image data for images displaying predetermined conditions required to increase the number of opponent characters and images displaying predetermined items for selection, a mahjong game machine control program for regulating the overall flow of the mahjong game, a program for creating a ranking list on the basis of various playing data, and so on. The ROM 32 also stores a plurality of items of attraction image data as attraction data for each opponent character. The attraction data include image data for presenting an attraction prior to a game against the opponent character, image data for an attraction that is presented in accordance with the result of the game against the opponent character, sound data, and so on. Note that images of the opponent characters, the speech of the opponent characters, background images, and so on may be stored separately and combined on the display device 13 to form a single screen.

The sound data are not restricted in particular, and may be voice data such as human speaking, shouting, and exclaiming, music data and the like, or a combination thereof. The image of each opponent character may represent the whole body or a part thereof such as a face. The attractions may be performed with one or both of an image and sound. The present invention mainly uses voice data such as human speaking, and hence in the following description, such data may be referred to as voice data.

The RAM 34 stores various types of selection data, game data, and so on. The game data include information concerning the winner and loser in a game against an opponent character, the points acquired by the player in the game against the opponent character, the number of times the opponent character has completed hands, and so on. The selection data are data indicating the ranking type and the result of a selection of the ranking criterion, for example.

A random number generator 41 for generating a random number to be sampled, a sampling circuit 40, a sound circuit 35, a graphic display circuit 36, and a communication interface circuit 39 for conducting communications are connected to the CPU 31.

The sound circuit 35 is connected to a sound amplifier 37 which outputs various voices corresponding to the state of development of the mahjong game. The graphic display circuit 36 causes the display device 13 to display an image selected according to a control signal from the CPU 31.

As described below, the mahjong game machine 10 disposed in a game arcade is connected to the information processing device 100 which manages these data, and is thus capable of transmitting and receiving data to and from the information processing device 100 by way of the communication interface circuit 39 (see FIG. 9).

An example of the content of a mahjong game played on the mahjong game machine 10 will now be explained in detail.

(A) Game Rules

For example, the player selects a specific opponent character from among four opponent characters (for example, characters A to D), and plays a game of mahjong to compete for victory.

The player and opponent character each have a predetermined score (for example, 10,000 points) at the beginning of the game, and when the opponent character's score reaches zero or the player completes hands three times, the player wins. If, on the other hand, the player's score reaches zero as a result of the opponent character completing hands or the like, the player loses.

(B) Attractions

After selecting a specific opponent character, attractions such as having the opponent character exchange greetings with the player are presented prior to the game, and during the course of the game, attractions are presented to show reactions to a move performed by the player and so on. Once the outcome of the game has been decided, post-game attractions are presented in accordance with the game result.

(C) Ranking

Various data relating to the game with the opponent character are stored, and ranking lists based on various ranking criteria are determined on the basis of these game data and displayed. Examples of such ranking criteria include number of victories, winning percentage, the number of points acquired in usual one game period ("Hanchan"), consecutive wins achieved by reducing the opponent character's score to zero, number of rounds required from the beginning of the game to reduce the opponent's score to zero, and so on. Rankings based on the criteria described above may also be determined for each of the opponent characters.

In the present invention, the ranking criterion changes at predetermined intervals, whereby a new ranking list is created and displayed on the basis of the newly set ranking criterion.

Note that the aforementioned game data are data generated upon the completion of a game, and include not only simple win/loss data, but also various other data such as the scores obtained by the player and opponent characters, the number of times the player and opponent characters completed hands, and the playing time.

Figure 4:
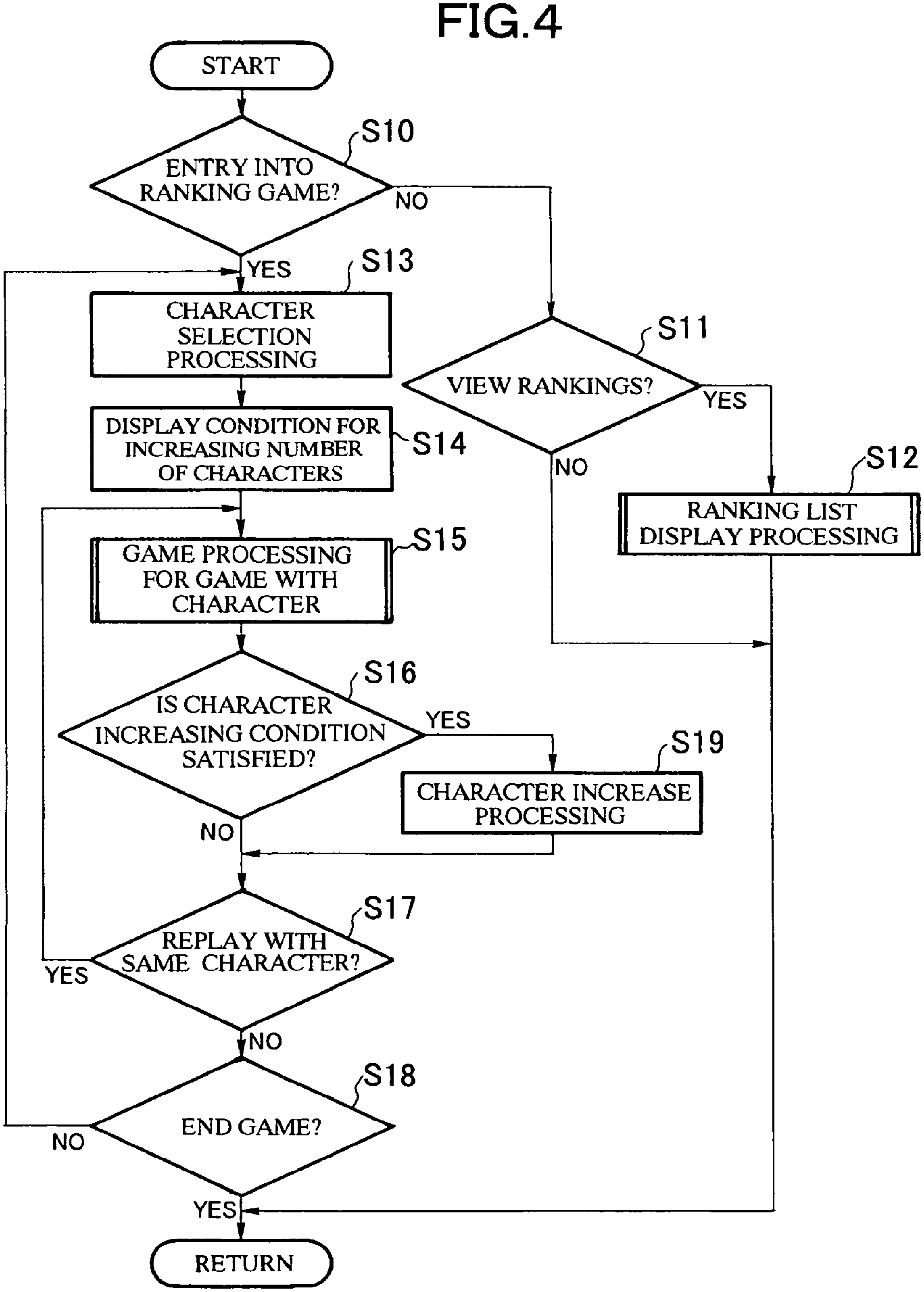
FIG. 4 is a flowchart showing a subroutine executed in the mahjong game machine shown in FIG. 1.

FIG. 4 is a flowchart showing a subroutine executed in the mahjong game machine 10. This subroutine is executed after being accessed from the mahjong game machine control program, which is executed in advance for controlling the mahjong game of the mahjong game machine 10 when the player inserts a predetermined coin into the coin insertion slot 18 and pushes the operating button 17*f* of the operating device 15.

The surname of the player and an entry name to refer to the player during the game are input into the mahjong game machine 10 via the operating unit at the beginning of a game and stored so that each player can be identified. The mahjong game machine 10 may also be provided with a card insertion slot for inserting a memory card, and reading means for reading player information stored on an inserted memory card.

First, the CPU 31 determines whether or not a selection has been performed to enter a ranking game (step S10).

More specifically, the CPU 31 displays a screen enabling the player to select whether or not to enter a ranking game, and encourages the player to make a selection. By pressing an operating button corresponding to entry into a ranking game or an operating button corresponding to another selection, the player selects whether or not to enter a ranking game.

If the player selects not to enter a ranking game, the CPU 31 then determines whether or not a selection has been performed to view a ranking list display (step S11).

If the player selects not to view the rankings, the subroutine ends. However, if the player selects to view the rankings, ranking list display processing is performed (step S12). This ranking list display processing will be described in detail hereinafter.

If, in the step S10, the player selects to enter a ranking game, the CPU 31 then displays a screen for selecting a character (step S13). In other words, the CPU 31 displays a list showing the name of each character, and encourages the player to select a character. By performing an operation such as pressing an operating button corresponding to one of the opponent characters, the player selects an opponent character.

In the first game, there are four opponent characters, for example, and if predetermined conditions are satisfied during the game, as will be described below, the number of characters that may be selected increases to five and six.

Further, each opponent character has characteristics peculiar to that opponent character regarding mahjong completion and so on. Examples of these characteristics include a favorite manner of completion such as "Tang Yao", the ability to achieve "Tsumo" quickly, a liking for "Li-Zhi", and so on.

When it is determined in step S13 that opponent character selection processing has been performed, the CPU 31 then calls up an image from the ROM 32 displaying a predetermined condition for increasing the number of opponent characters, and displays this image (step S14).

Examples of the condition include three consecutive victories in games with the same opponent character during which the score of the opponent character is reduced to zero or less, five consecutive victories over the same opponent character, and so on. These conditions may be expressed clearly or merely intimated.

Once the processing of step S14 has been executed, the CPU 31 then performs game processing for a game against the opponent character (step S15).

This game processing will be described in detail hereinafter, but note that various game data are stored as a result thereof.

Once game processing has been executed in the step S15, the CPU 31 then determines whether or not the predetermined condition for increasing the number of opponent characters has been satisfied on the basis of the game result (step S16). More specifically, on the basis of the stored game result, the CPU 31 determines whether or not the player has achieved three consecutive victories in games against the same opponent character during which the score of the opponent character was reduced to zero or less, for example.

If it is determined that the predetermined condition for increasing the number of opponent characters has not been satisfied, the CPU 31 determines whether or not the player has selected to play another game against the same opponent character (step S17). In other words, the CPU 31 displays a screen enabling the player to select whether to play another game against the same opponent character, to play a game against a different opponent character, and so on, thus encouraging the player to make a selection.

If it is determined in step S17 that the player has selected to play a game against the same opponent character, the CPU 31 returns to the processing of step S15. In this case, another game is played against the same opponent character.

If, on the other hand, it is determined in step S17 that the player has selected not to play another game against the same opponent character, the CPU 31 determines whether or not the player has selected to end the mahjong game (step S18). When it is determined in step S17 that the player has selected to end the mahjong game, the subroutine ends.

If it is determined in step S18 that the player has selected not to end the mahjong game, this indicates that the player has selected to play a game against another opponent character, and hence the CPU 31 returns to the processing of step S13. In this case, the image for selecting an opponent character is displayed.

If it is determined in step S16 that the predetermined condition for increasing the number of opponent characters has been satisfied, the CPU 31 performs processing for increasing the number of opponent characters (step S19).

In other words, the CPU 31 selects an opponent character from among unselected opponent characters stored in the ROM 32 by sampling or the like, and displays an image and so on thereof.

After the processing of step S19, the processing of step S17 is executed. Since the processing of step S17 has already been described, further description thereof has been omitted here.

Game processing for a game against an opponent character will now be described.

Figure 5:
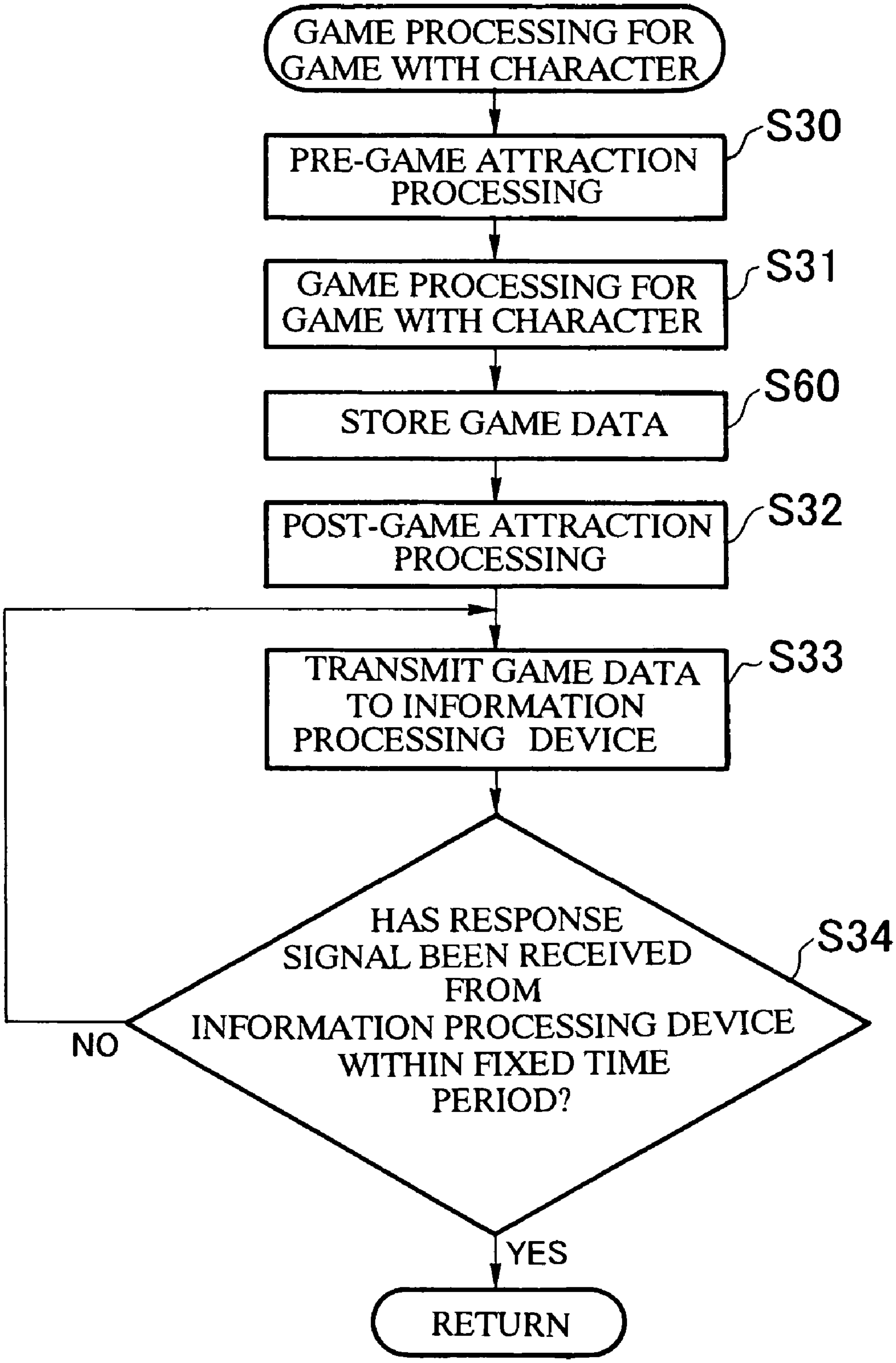
FIG. 5 is a flowchart showing a processing routine for a game against an opponent character that is accessed and executed in a step S15 of the subroutine shown in FIG. 4.

FIG. 5 is a flowchart showing a processing routine for a game against an opponent character that is accessed and executed in step S15 of the subroutine shown in FIG. 4.

After an opponent character (character A, for example) has been selected, the CPU 31 first executes pre-game attraction processing (step S30). More specifically, the CPU 31 selects one item of image data from the pre-game image data comprising the opponent characters stored in the ROM 32, and displays the image data on the display device 13. This image selection may be performed by sampling using sampling means.

These image data are used to display the appearance and speech of the opponent character, examples of the speech being "Good to see you again!", "I didn't think you'd be here again!", and so on. Further, when the screen image is displayed, a voice corresponding to this speech may be output from the sound amplifier 37 on the basis of the attraction data set in the RAM 34.

Next, processing concerning a game against the character A is executed (step S31). When the processing of step S31 is executed, the mahjong game proceeds in the above-mentioned sequence, whereby a single game from the distribution of 13 or 14 tiles, which serve as the initial tiles of the player, (i.e. from tile distribution) to a confirmation that the player or the opponent character (character A) has completed a hand, or that neither has completed a hand (i.e. that no hand is completed), is repeated until the score of the player or the opponent character reaches zero or the player completes a hand 3 times.

After the processing of step S31, various game data, including win/loss information in the game between the player and opponent character, the scores obtained by the opponent character and player in a single game, the number of times the player and opponent character completed a hand, the game time, and so on, are stored in the RAM 34 (step S60).

When executing step S60, the CPU 31 and RAM 34 function as game data storage means for storing game data generated during a game between the player and opponent character.

After executing the processing of step S31, the CPU 31 then executes post-game attraction processing (step S32). In this post-game attraction processing, a determination is made as to whether or not the player won the game against the opponent character (the character A), and if the player beat the opponent character, an attraction is presented in accordance with the number of times the opponent character completed a hand during the game. A corresponding attraction image is also displayed when the player loses to the opponent character.

Next, the CPU 31 transmits the various game data to the information processing device (step S33), and subsequently determines whether or not a response signal notifying reception of the data has been received from the information processing device within a fixed time period (step S34).

When executing step S33, the CPU 31 and RAM 34 function as game data transmission means for transmitting game data generated during a game between the player and opponent character to the information processing device.

If it is determined that the response signal has not been received, the processing returns to step S33, where the game data are transmitted to the information processing device once more, after which the subroutine ends. The relationship between the information processing device and the mahjong game machine and so on will be described in further detail hereinafter.

Next, images displayed on the display device 13 of the mahjong game machine 10 during execution of the processing shown in FIG. 4 will be described using FIGS. 6 to 8.

Figure 6A:
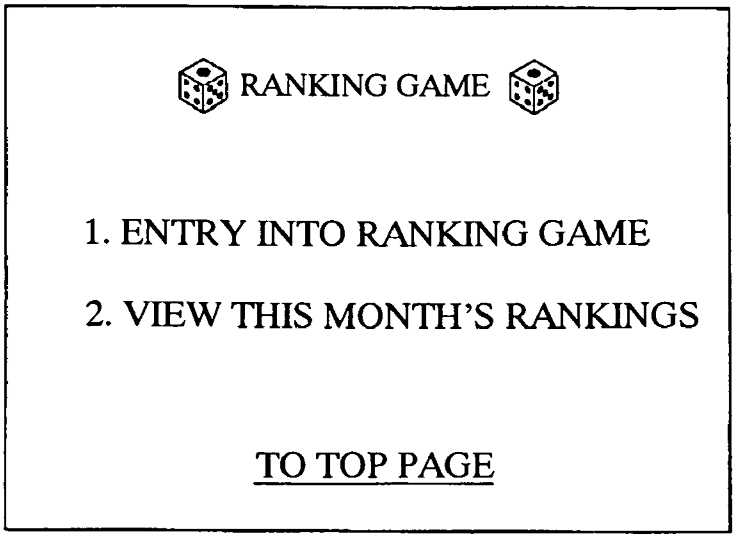
FIGS. 6A to 6C are views schematically showing examples of images displayed on a display device 13 when the processing of the subroutine shown in FIG. 4 is executed.
Figure 6B:
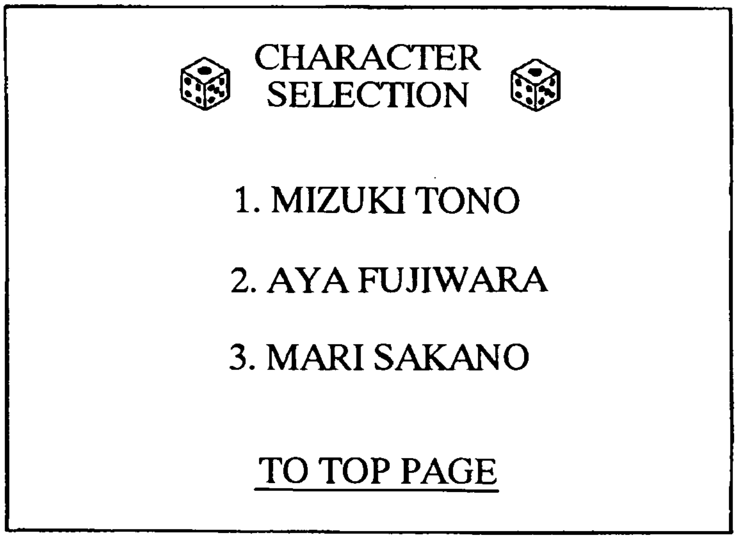
Figure 6C:
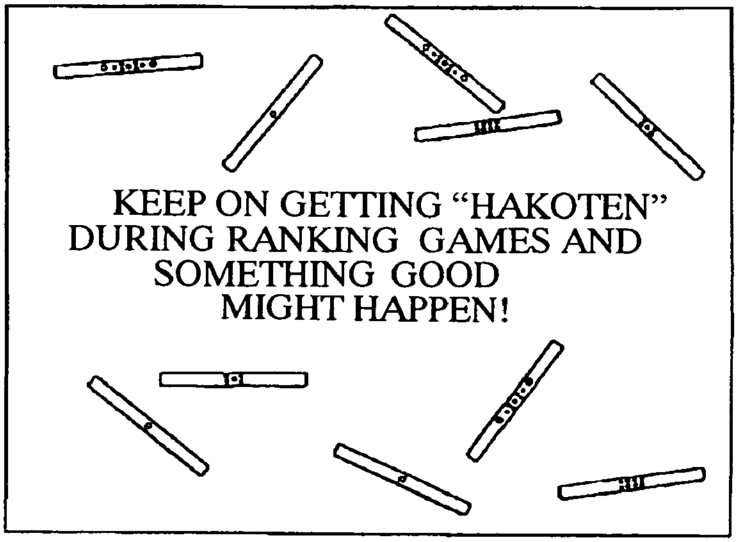

FIGS. 6A to 6C are views schematically showing examples of images displayed on the display device 13 during execution of the processing of steps S10, 11, 13, and 14 in the subroutine shown in FIG. 4.

The screen image shown in FIG. 6A is the image which is displayed to encourage the player to select whether to enter a ranking game or view the rankings in steps S10 and 11 in the subroutine shown in FIG. 4.

By pressing an operating button corresponding to 1, the player selects to enter a ranking game, and by pressing an operating button corresponding to 2, the player selects to view the rankings.

The screen image shown in FIG. 6B is the image displayed for selecting a character in step S13. By pressing an operating button corresponding to 1, for example, the opponent character known as "Mizuki Tono" is selected.

The screen image shown in FIG. 6C is the image displayed in step S14 for informing the player of the predetermined condition for increasing the number of opponent characters. In this image, the condition is not described explicitly, but rather intimated as "Keep on getting "Hakoten (loosing all one's points)" during ranking games, and something good might happen!". By using this method of intimation, the player's pleasure is heightened when a new opponent character is actually displayed.

Figure 7A:
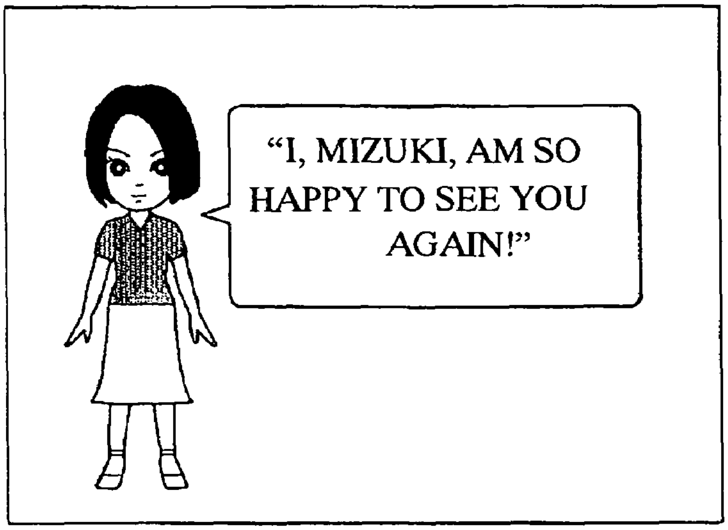
FIGS. 7A to 7C are views schematically showing examples of images displayed on the display device 13 when the game processing for a game against an opponent character shown in FIG. 5 is executed.
Figure 7B:
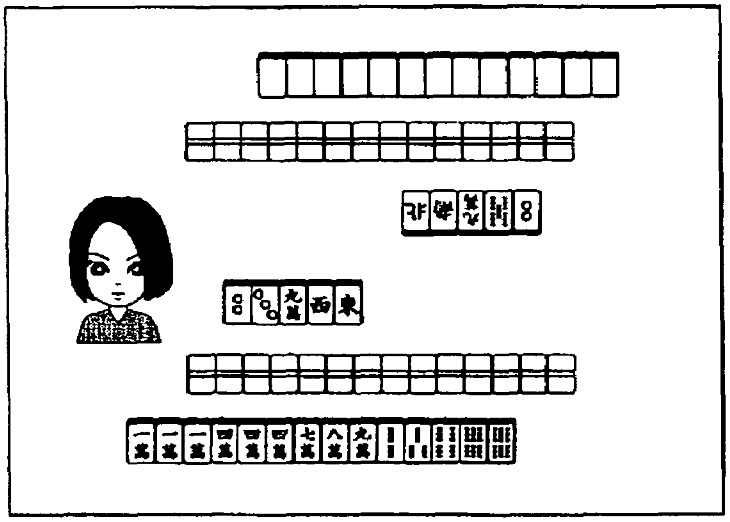
Figure 7C:
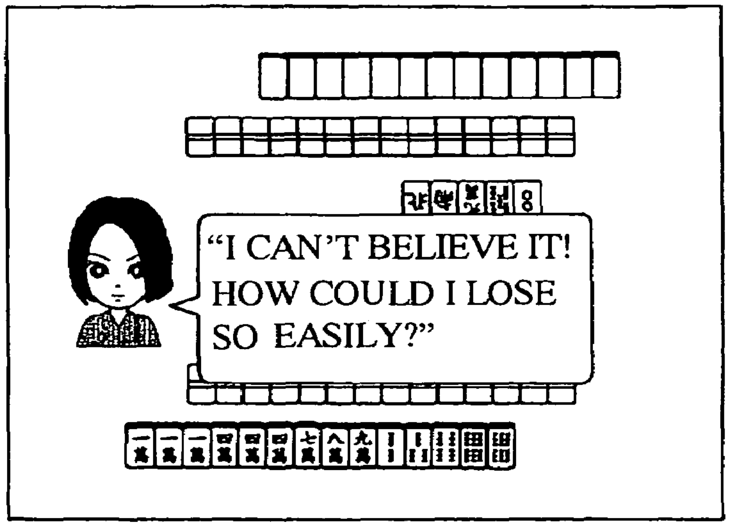

FIGS. 7A to 7C are views schematically showing examples of images displayed on the display device 13 during execution of the game processing for a game against an opponent character shown in FIG. 5.

The screen image shown in FIG. 7A is an image relating to an attraction presented in step S30 prior to a game against the opponent character.

Here, an image showing the appearance of the opponent character "Mizuki Tono" is displayed together with a speech balloon containing the phrase "I'm so happy to see you again!" Further, a voice corresponding to this phrase may be output from the sound amplifier 37 on the basis of the attraction data set in the RAM 34 while the screen image shown in FIG. 7A is displayed.

The screen image shown in FIG. 7B is an image relating to an attraction presented in step S31 during the game against the opponent character.

In the lower portion of the screen image shown in FIG. 7B, an image of the tiles owned by the player is displayed, and in the upper portion of the screen image, an image of the tiles owned by the opponent character is displayed. Note that the opponent character's tiles are displayed face down so that they cannot be seen by the player. Further, an image of the tiles discarded by the opponent character is displayed below the image showing the opponent character's tiles.

The screen image shown in FIG. 7C is the image that is displayed on the display device 13 when attraction data corresponding to the game result are selected in step S32, and an attraction is presented on the basis of these attraction data.

In FIG. 7C, an image of "Mizuki Tono" and a speech balloon containing the phrase "I can't believe it! How could I lose so easily?" are displayed, thus expressing the fact that the player won an overwhelming victory.

Figure 8A:
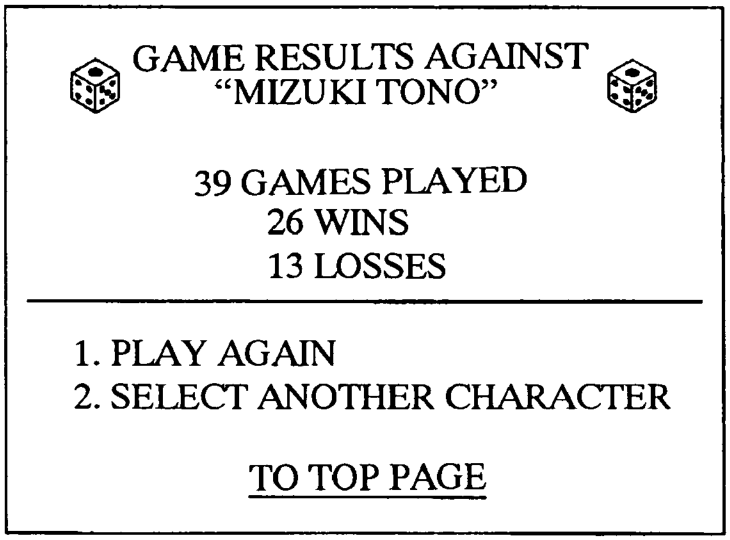
FIGS. 8A to 8C are views schematically showing examples of images displayed on the display device 13 when the processing of the subroutine shown in FIG. 4 is executed.
Figure 8B:
Figure 8C:
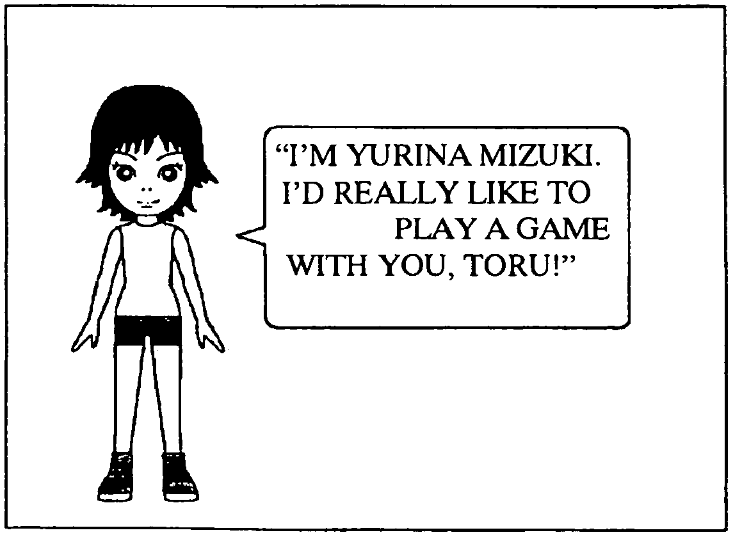

FIGS. 8A to 8C are views schematically showing examples of images displayed on the display device 13 when the processing of steps S16 and 19 are executed in the subroutine shown in FIG. 4.

The screen image shown in FIG. 8A is the image that is displayed in step S17 to encourage the player to select either to play another game against the same opponent character or to play a game against a different opponent character.

As shown in the image, by pressing an operating button corresponding to 1, the player selects to play another game against the same opponent character, and by pressing an operating button corresponding to 2, the player selects to play a game against a different opponent character.

Note that in the upper portion of the screen, an image showing past results against the opponent character "Mizuki Tono" is displayed, enabling the player to check the results of past games against the opponent character.

The screen images shown in FIGS. 8B, 8C are the images displayed in step S16 when the predetermined condition for increasing the number of opponent characters has been satisfied.

First, the screen in FIG. 8B shows an image with the lines "You got Hakoten over me three times in a row. As a reward, allow me to introduce a new character, Yurina Mizuki!", together with an image of the appearance of "Mizuki Tono".

Next, the screen in FIG. 8C shows an image of the appearance of the new opponent character "Yurina Mizuki", together with a speech balloon containing the lines "I'm Yurina Mizuki. I'd really like to play a game with you, Toru!", spoken by "Yurina Mizuki".

Next, ranking list display processing will be described.

A ranking list for a single mahjong game machine can be displayed, but it is easier for a player to evaluate his/her skills when an overall ranking list for the entire game arcade is displayed. Hence the mahjong game machines in the game arcade are connected to the information processing device 100 via a network connection so that all of the game data can be gathered to create an overall ranking list.

Figure 9:
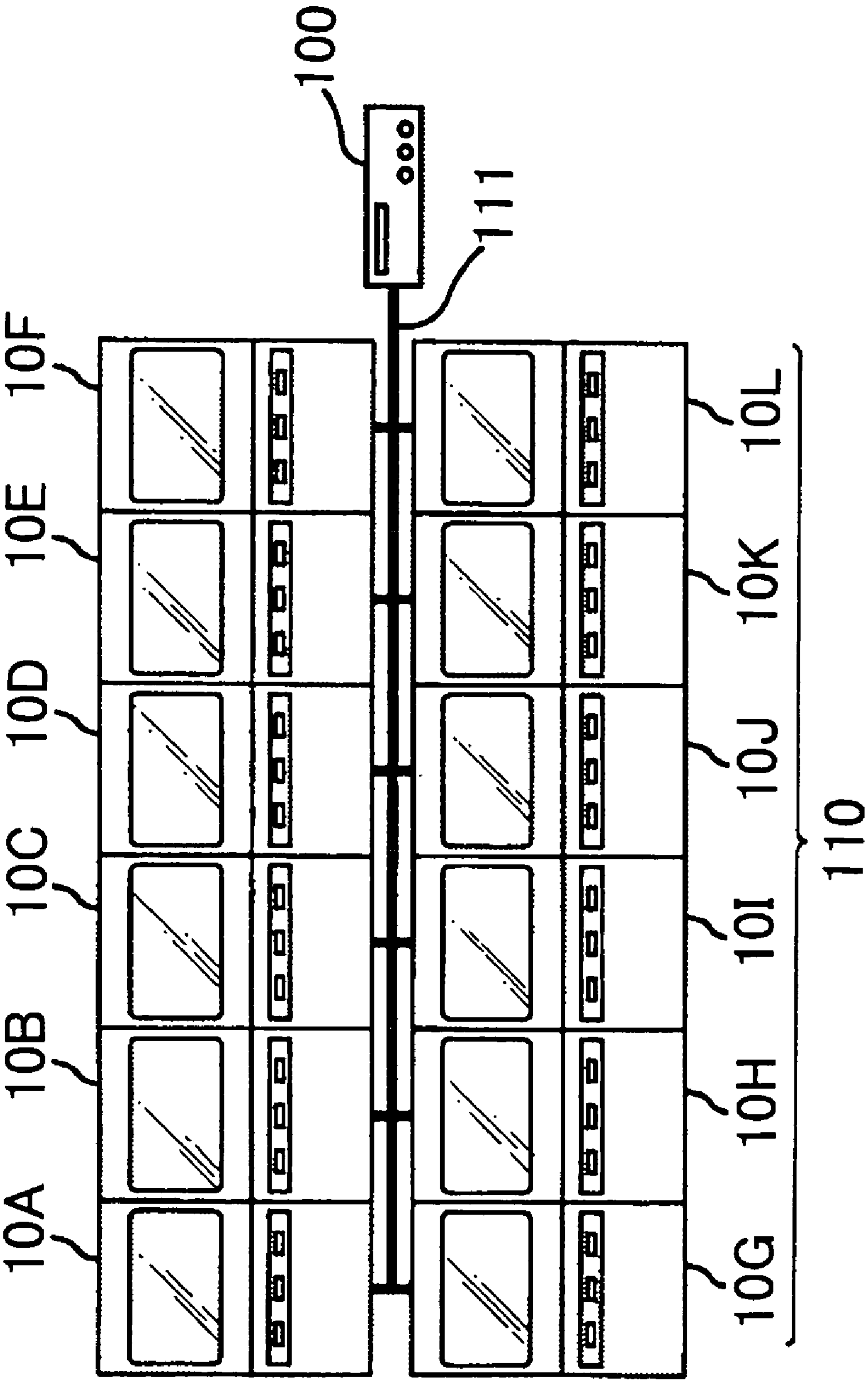
FIG. 9 is a conceptual diagram showing schematically a network system comprising mahjong game machines and an information processing device.
Figure 10:
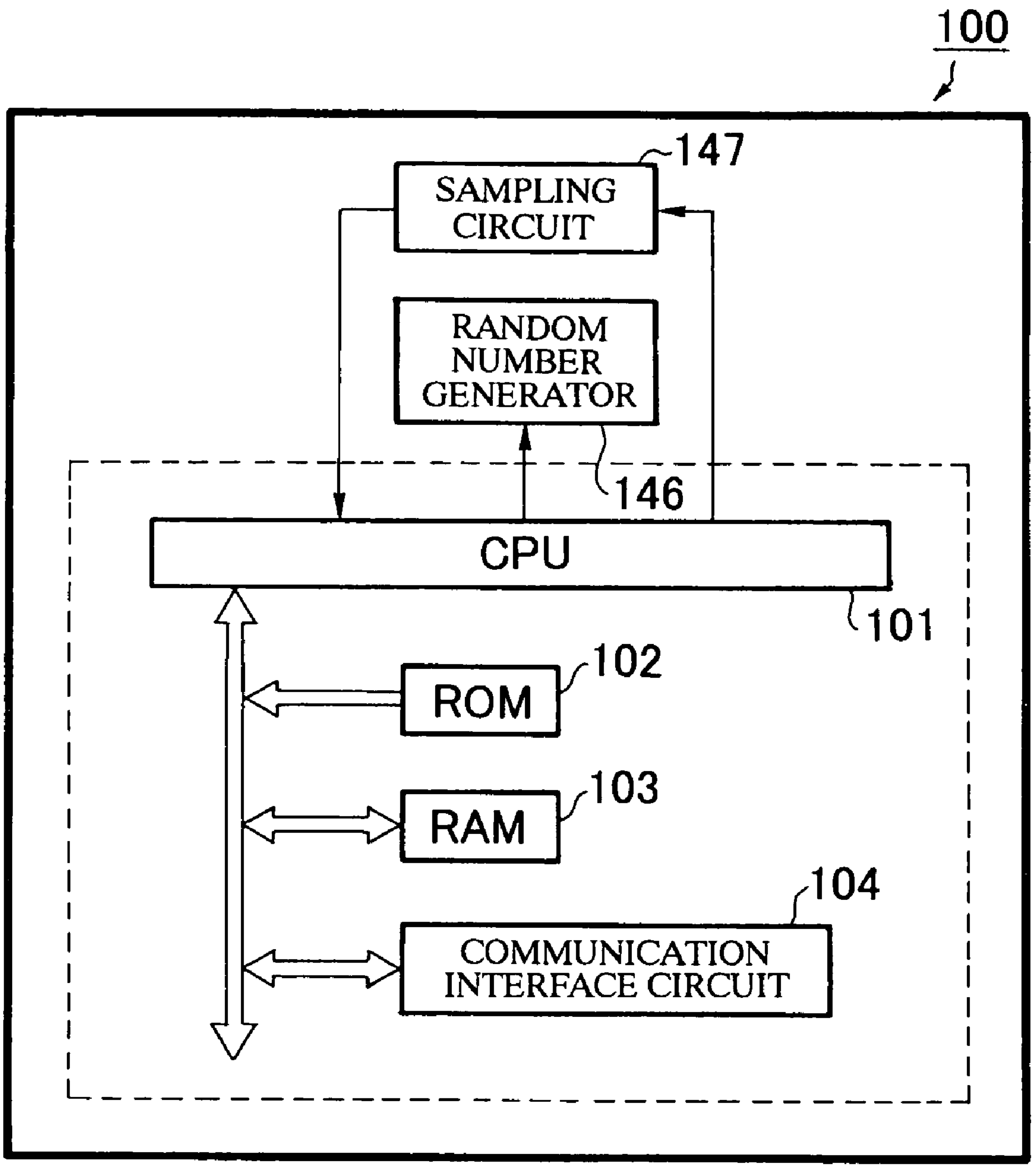
FIG. 10 is a schematic block diagram showing the inner configuration of the information processing device 100 shown in FIG. 9.

FIG. 9 is a conceptual diagram showing schematically a network system comprising the mahjong game machine shown in FIG. 1 and the information processing device, and FIG. 10 is a schematic block diagram showing the inner configuration of the information processing device.

A gaming machine group 110 is constituted by twelve mahjong game machines 10 (10A to 10L), and these mahjong game machines 10A to 10L are connected respectively to the information processing device 100 via a network 111 that is either wired or wireless.

Further, as shown in FIG. 10, the information processing device 100 comprises a CPU 101, a ROM 102, a RAM 103, and a communication interface circuit 104. A random number generator 146 for generating a random number to be sampled, and a sampling circuit 147 are connected to the CPU 101. The information processing device 100 is also capable of executing random number sampling on an operating program of the CPU 101. The ROM 102 stores a program for allowing communication between the mahjong game machines 10 and the communication interface circuit 104 through the network 111, a program for conducting a sampling, a sampling table used in a random number sampling determination, ranking criterion data which serve as the criteria for creating a ranking list, and so on, for example. The RAM 103 stores game data and the like transmitted from the mahjong game machines 10 (10A to 10L).

More specifically, the information processing device 100 receives and stores game data transmitted from each mahjong game machine 10 (10A to 10L), and uses these data as a foundation to create a ranking list based on the aforementioned ranking criterion data. In response to a request from one of the mahjong game machines 10A to 10L, predetermined ranking data are transmitted to one of the mahjong game machines 10A to 10L which placed the request, and thus a ranking list is displayed on the mahjong game machines 10A to 10L.

First, ranking criterion modification processing will be described.

Figure 11:
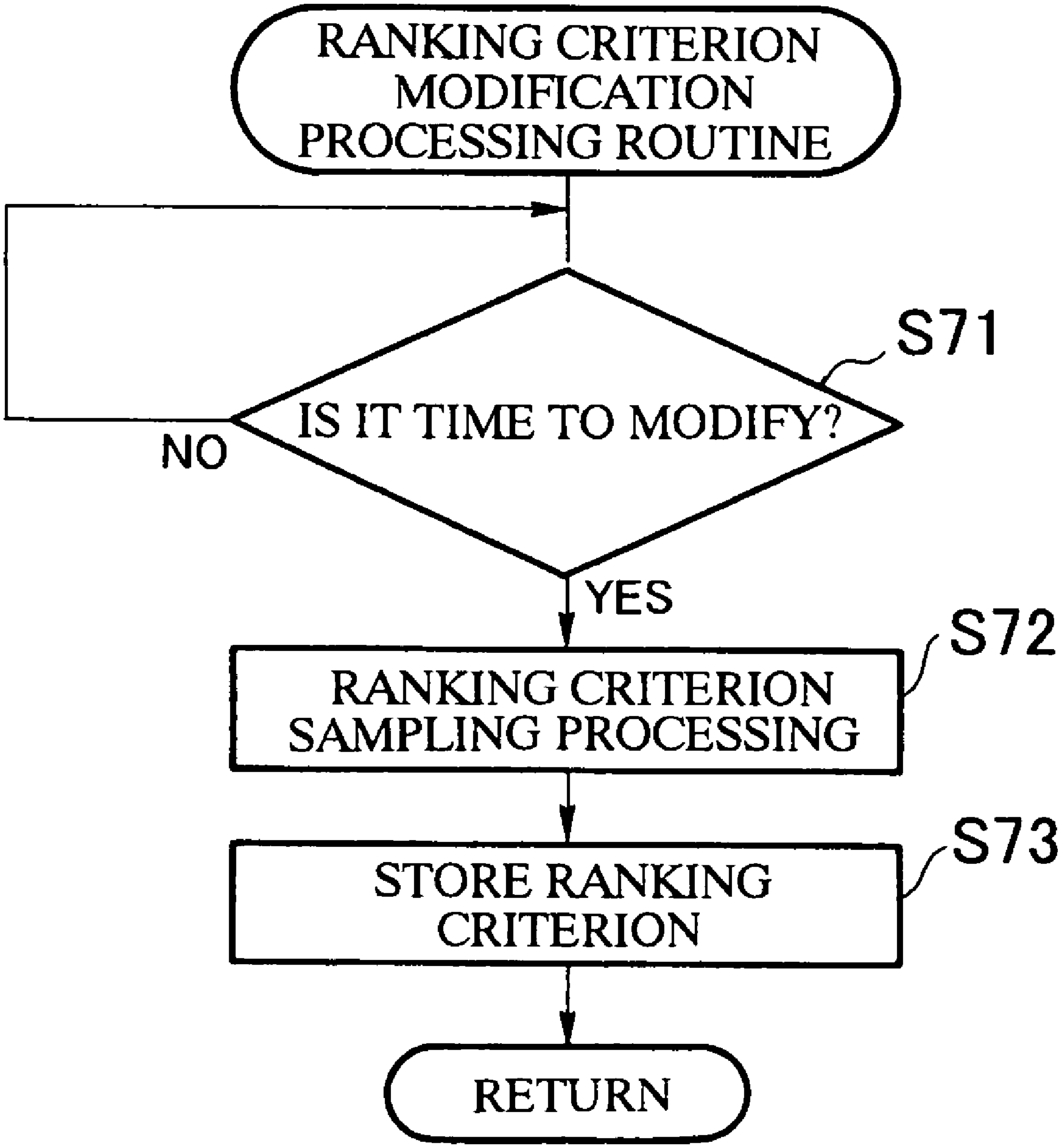
FIG. 11 is a flowchart showing a ranking criterion modification processing routine.

FIG. 11 is a flowchart showing a ranking criterion modification processing routine executed in the information processing device 100.

First, the CPU 101 determines whether or not a ranking criterion modification time has been reached (step S71).

More specifically, a timer is set, and the determination as to whether or not the ranking criterion modification time has been reached is performed on the basis of the timer. When it is determined that the ranking criterion modification time has not been reached, the process returns to step S71.

Note that a ranking list is usually determined monthly on the basis of the game data, but here, the item serving as the criterion for determining the ranking list (the ranking criterion) also changes monthly. The ranking criterion may also be changed weekly or quarterly.

When it is determined to be time to modify the ranking criterion, the CPU 101 conducts a ranking criterion sampling on the basis of a ranking criterion table, and thus selects a ranking criterion which is set as the ranking criterion (step S72).

The ranking criterion table lists items such as the number of victories, winning percentage, the number of points acquired in a "Hanchan" (East round and South round), number of rounds required from the beginning of the game to reduce the opponent character's score to zero, the speed with which this was achieved, number of victories under the rule whereby a game is won by reducing the opponent character's score to zero or less, and so on, and allocates a number to each criterion. The ranking criterion table is stored in the ROM 102.

The random number generator 146 for generating random numbers to be sampled and the sampling circuit 147 are connected to the CPU 101.

The CPU 101 uses the random number generator 146 for generating random numbers to be sampled and the sampling circuit 147 to perform numerical value sampling, and selects a ranking criterion on the basis of the obtained numerical value.

Next, the CPU 101 stores the ranking criterion selected in step S72 in the RAM 103 (step S73).

When the ranking criterion is modified as described above, games may be won and lost according to rules that have not been used before, and hence in such a case, the winning method itself changes. Therefore, the game program is set to change in response to a modification of the ranking criterion.

In the present invention, a single ranking criterion may be selected and set in a predetermined sequence on the basis of the ranking criterion table described above. Further, a game may be played to predict the next ranking criterion, and if the prediction is correct, points or bonuses may be awarded. By means of such events and the like, the player can be drawn further into the mahjong game.

During the processing of steps S71 to S73, the CPU 101 and RAM 103 function as ranking criterion setting means for setting a ranking criterion to be used when a ranking list is created on the basis of the game data.

Next, a processing routine for displaying a ranking list will be described.

Figure 12:
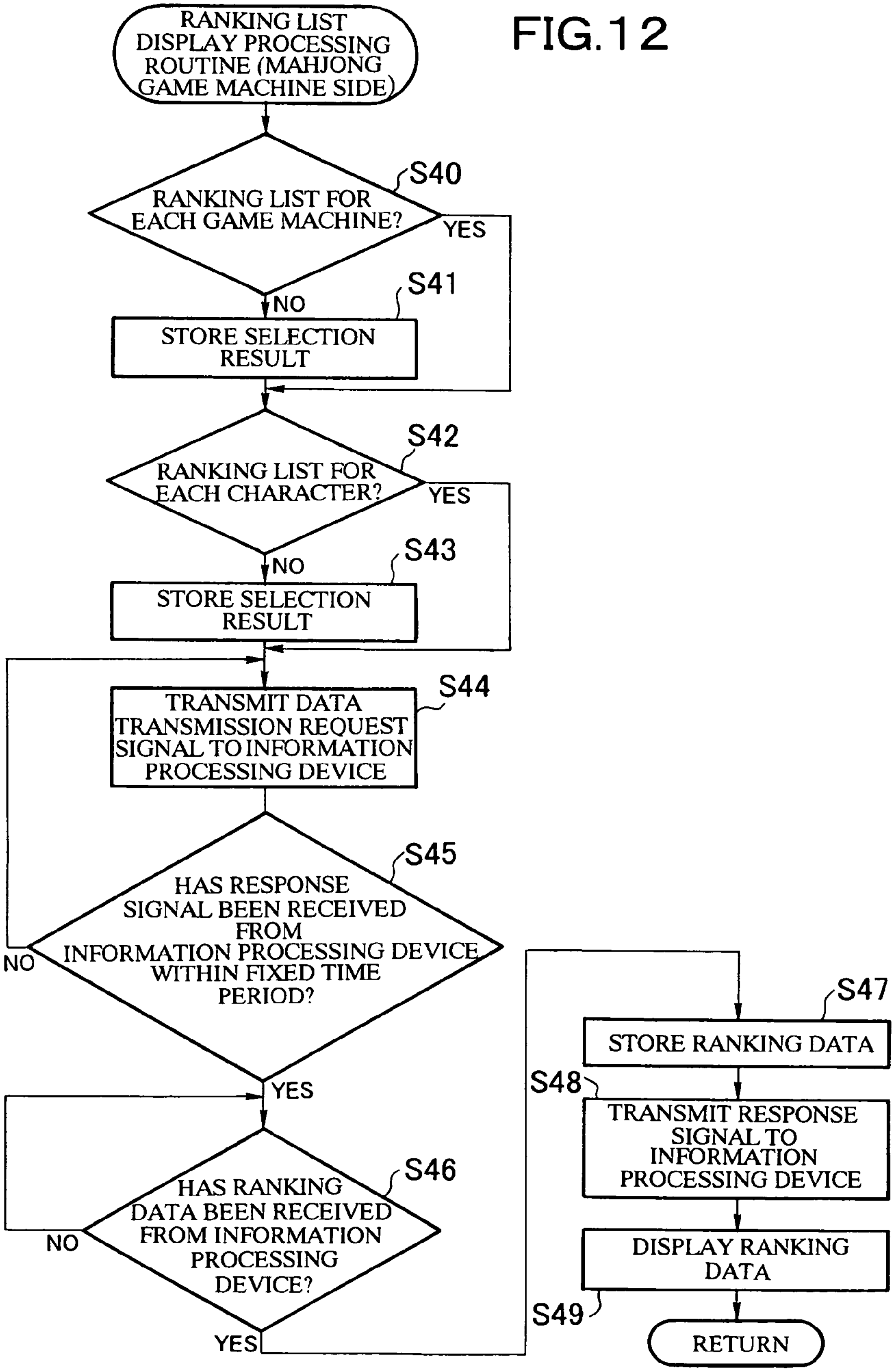
FIG. 12 is a flowchart showing a routine executed on the mahjong game machine side during a subroutine shown in FIG. 12.

FIG. 12 is a flowchart showing a processing routine executed on the mahjong game machine side for displaying a ranking list, which is accessed and executed in step S12 of the subroutine shown in FIG. 4.

When the player selects to view the rankings, first the CPU 31 determines whether or not a selection has been made to display a ranking list for each mahjong game machine (step S40).

In other words, the CPU 31 displays an image enabling the player to select to view the rankings for each mahjong game machine or to view a ranking list for all of the mahjong game machines in the game arcade, and encourages the player to make a selection.

When it is determined that the player has selected to view the rankings for each mahjong game machine in step S40, the CPU 31 stores the resultant selection data in the RAM 34 (step S41).

When the player selects to view the rankings for each mahjong game machine, a ranking list for the mahjong game machine on which the player is playing mahjong is usually displayed. However, a constitution is possible whereby the player inputs the number of a specific mahjong game machine, and is thus able to view the ranking list for that specific mahjong game machine.

When it is determined in step S40 that the player has not selected to display the rankings for each mahjong game machine, this means that the player has selected to view the ranking list for all of the mahjong game machines in the game arcade, and accordingly, the CPU 31 stores the resultant selection data in the RAM 34 (step S41).

When the processing of step S41 is executed, the CPU 31 then determines whether or not a selection has been made to display the rankings for each opponent character (step S42). If it is determined that the player has selected to view the rankings for each opponent character in step S42, the CPU 31 stores the resultant data in the RAM 34 (step S43).

If, on the other hand, it is determined that the player has not selected to view the rankings for each opponent character in step S40, this means that a selection has been made to display the rankings with no distinction between the opponent characters, and hence the CPU 31 stores the resultant selection data in the RAM 34 (step S43).

Then, on the basis of the data stored in the RAM 34 in steps S41 and S43, the CPU 31 transmits a data request signal to the information processing device 100 requesting the transmission of the corresponding ranking data (step S44).

Next, the CPU 31 determines whether or not a response signal notifying reception of the data request signal has been received from the information processing device 100 within a fixed time period following transmission of the data request signal (step S45).

This response signal is transmitted from the information processing device 100 in a step S51, to be described below.

If it is determined in step S45 that a response signal has not been received from the information processing device 100 within the fixed time period, the CPU 31 returns to the processing of step S44, and retransmits the data request signal requesting transmission of the corresponding data to the information processing device 100.

If, on the other hand, it is determined that a response signal notifying reception of the request signal has been received from the information processing device 100, the CPU 31 then determines whether or not the corresponding ranking data have been received from the information processing device 100 (step S46).

These ranking data are transmitted from the information processing device 100 in a step S52, to be described below.

When it is determined that the corresponding data have not been received, the CPU 31 returns to the processing of step S46. On the other hand, if it is determined in step S46 that the corresponding data have been received from the information processing device 100, the CPU 31 then stores the ranking data in the RAM 34 (step S47).

Following the processing of step S47, the CPU 31 transmits a response signal notifying reception of the data to the information processing device 100 (step S48).

After transmitting the response signal notifying reception of the ranking data to the information processing device 100, the CPU 31 displays a corresponding ranking list image on the display device 13 based on the data stored in the RAM 34 (step S49), and then ends the subroutine.

Next, a processing routine executed on the information processing device side for displaying a ranking list will be described.

Figure 13:
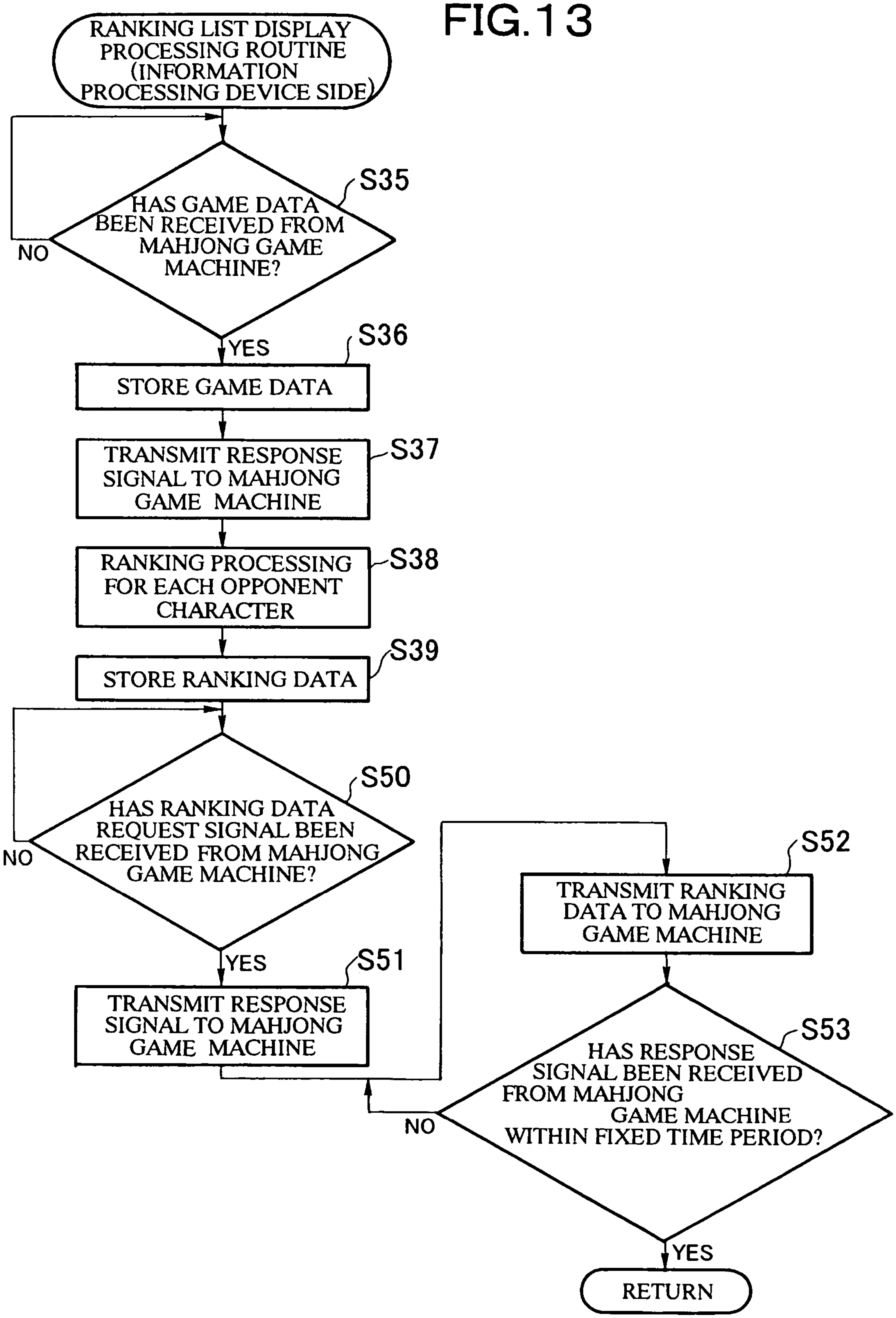
FIG. 13 is a flowchart showing a routine executed on the information processing device side during the subroutine shown in FIG. 12.

FIG. 13 is a flowchart showing a processing routine executed on the information processing device side for displaying a ranking list, which is accessed and executed in step S12 of the subroutine shown in FIG. 4.

First, the CPU 101 determines whether or not game data transmitted from the mahjong game machine 10A have been received in step S33 of FIG. 5 (step S35). When it is determined that the game data have not been received, the process returns to step S35.

When it is determined that the game data have been received, these game data are stored in the RAM 103 (step S36), and a response signal notifying reception is transmitted to the mahjong game machine 10A (step S37).

During the processing of step S35, the CPU 101 functions as game data reception means. By repeating this process, game data from various mahjong game machines can be gathered and stored, and subsequently used as ranking list display data.

During the processing of step S36, the CPU 101 and RAM 103 function as game data storage means for storing the game data received from the mahjong game machines.

Next, the CPU 101 uses the game data obtained in step S35 as a foundation to create a ranking list for each opponent character on the basis of the ranking criterion data stored in the RAM 103 as a ranking criterion in the ranking criterion modification processing routine shown in FIG. 11 (step S38), and then stores the ranking data for a single mahjong game machine or all of the mahjong game machines in the game arcade (step S39).

During the processing of step S38, the CPU 101 and RAM 103 function as ranking means for creating a ranking list for each opponent character on the basis of a predetermined criterion using the stored game data as a foundation. Note that new game data received in the information processing device 100 at predetermined time intervals (of five minutes, for example) are added to create a new ranking list on the basis of the ranking criterion.

Next, the CPU 101 determines whether or not a data transmission request signal relating to the display of a ranking list has been received from the mahjong game machine 10A (step S50).

This data transmission request signal is transmitted from the mahjong game machine 10A in step S44, as described above.

If it is determined that the data transmission request signal relating to ranking has not been received from the mahjong game machine 10A in step S50, the CPU 101 returns to the processing of step S50. However, if it is determined in step S50 that the data transmission request signal relating to ranking has been received from the mahjong game machine 10A, the CPU 101 transmits a response signal to the mahjong game machine 10A (step S51).

After transmitting the response signal to the mahjong game machine 10A in step S51, the CPU 101 transmits the corresponding ranking data stored in the RAM 103 to the mahjong game machine 10A (step S52).

During the processing of step S52, the CPU 101 and RAM 103 function as ranking data transmission means for transmitting ranked ranking data to the mahjong game machine.

After the corresponding ranking data have been transmitted to the mahjong game machine 10A in step S52, the CPU 101 determines whether or not a response signal notifying reception of the data has been received from the mahjong game machine 10A within a predetermined time period (step S53).

If it is determined in step S53 that a response signal has not been received from the mahjong game machine 10A within a predetermined time period, this means that the mahjong game machine 10A has not received the ranking list, and hence the process returns to step S52, where the corresponding ranking data are retransmitted to the mahjong game machine 10A.

If, on the other hand, it is determined that a signal notifying reception of the data by the mahjong game machine 10A has been received, the subroutine ends.

FIGS. 14A to 14D are views schematically showing examples of images displayed on the display device 13 when the processing of steps S40 to S49 of the subroutine shown in FIG. 12 is executed.

Figure 14A:
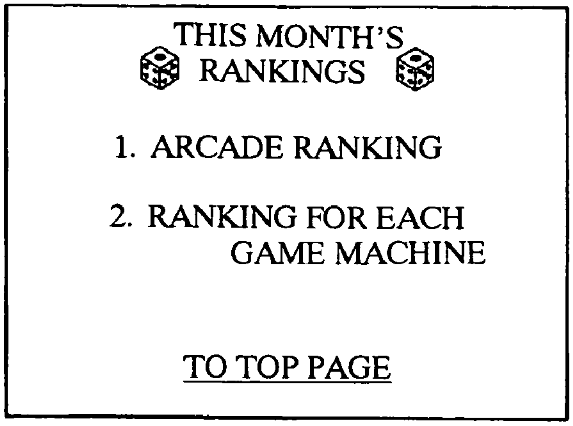
FIGS. 14A to 14D are views schematically showing examples of images displayed on the display device 13 when the processing of the subroutine shown in FIG. 12 is executed.

The screen image shown in FIG. 14A is an image displayed in step S40 to encourage the player to select whether to view the ranking lists for each mahjong game machine or the ranking list for all of the mahjong game machines in the game arcade.

By pressing an operating button corresponding to 1, the player selects to view the ranking list for all of the mahjong game machines in the game arcade, and by pressing an operating button corresponding to 2, the player selects to view ranking lists for each mahjong game machine.

Figure 14B:
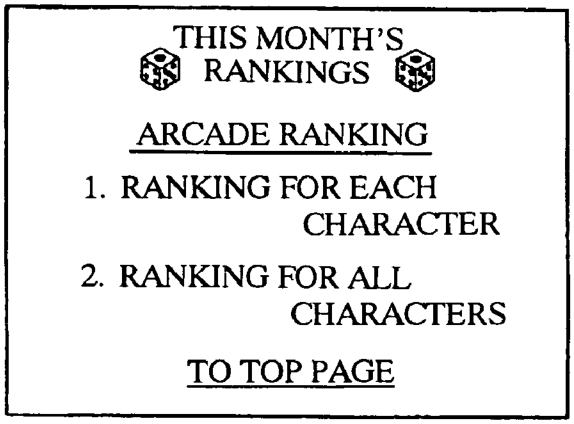

When the player selects to view the ranking list for all of the mahjong game machines in the game arcade in step S40, an image such as that shown in FIG. 14B, enabling the player to select whether to view the ranking lists for each opponent character or a ranking list which does not distinguish between opponent characters, is displayed. This image is displayed in step S42.

Figure 14C:
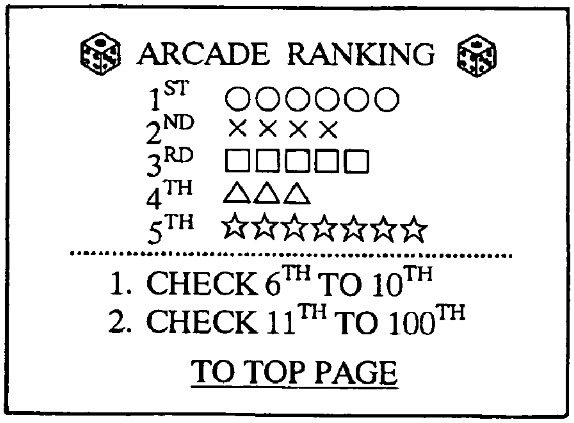

When the player selects to view the ranking list which does not distinguish between opponent characters in step S42, the names (or entry names) of the players from first to fifth position, for example, are displayed as shown in FIG. 14C. This image is displayed in step S48.

Figure 14D:
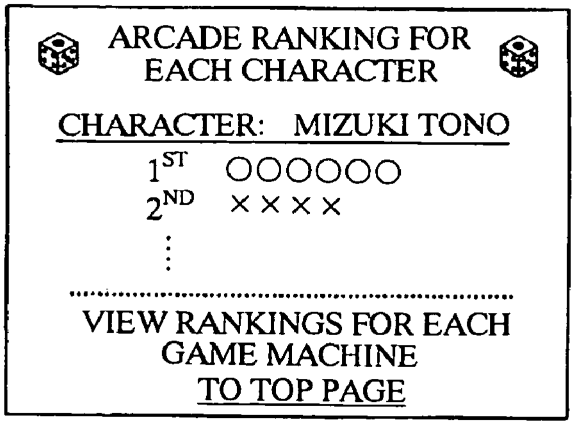

When the player selects to view ranking lists for each opponent character in step S41, the names (or entry names) of the players from first to fifth position when the opponent character is Mizuki Tono, for example, are displayed as shown in FIG. 14D. This image is also displayed in step S48.

By connecting the mahjong game machines 10 (10A to 10L) to the information processing device, a ranking list can be displayed for all of the mahjong game machines in the game arcade. However, by constructing a network within a wider fixed region to which the information processing device is connected via a wired or wireless network, a ranking list for the fixed region can be displayed. Moreover, by constructing a national network to which the information processing device is connected via a wired or wireless network, a national ranking list can be displayed.

Further, when a game is won or a ranking list is displayed, special points may be awarded when a player achieves a particularly good result, and when these points reach a fixed value, a bonus or image may be awarded as a present.

Second Embodiment

In the second embodiment to be described below, the mahjong game machine of the present invention is applied to a cellular phone, and the gaming machine control program of the present invention is stored in the cellular phone. Note that the gaming machine control program of the present invention may be applied not only to a mahjong game machine disposed in a game arcade or a cellular phone, but also to any electronic device which is capable of storing the gaming machine control program and conducting a mahjong game based on the gaming machine control program, for example a personal computer.

Processing in the cellular phone according to the second embodiment is substantially identical to the processing in the subroutines shown in FIGS. 4, 5, 11, 12, and 13, and hence a description of the cellular phone will be provided.

Figure 15:
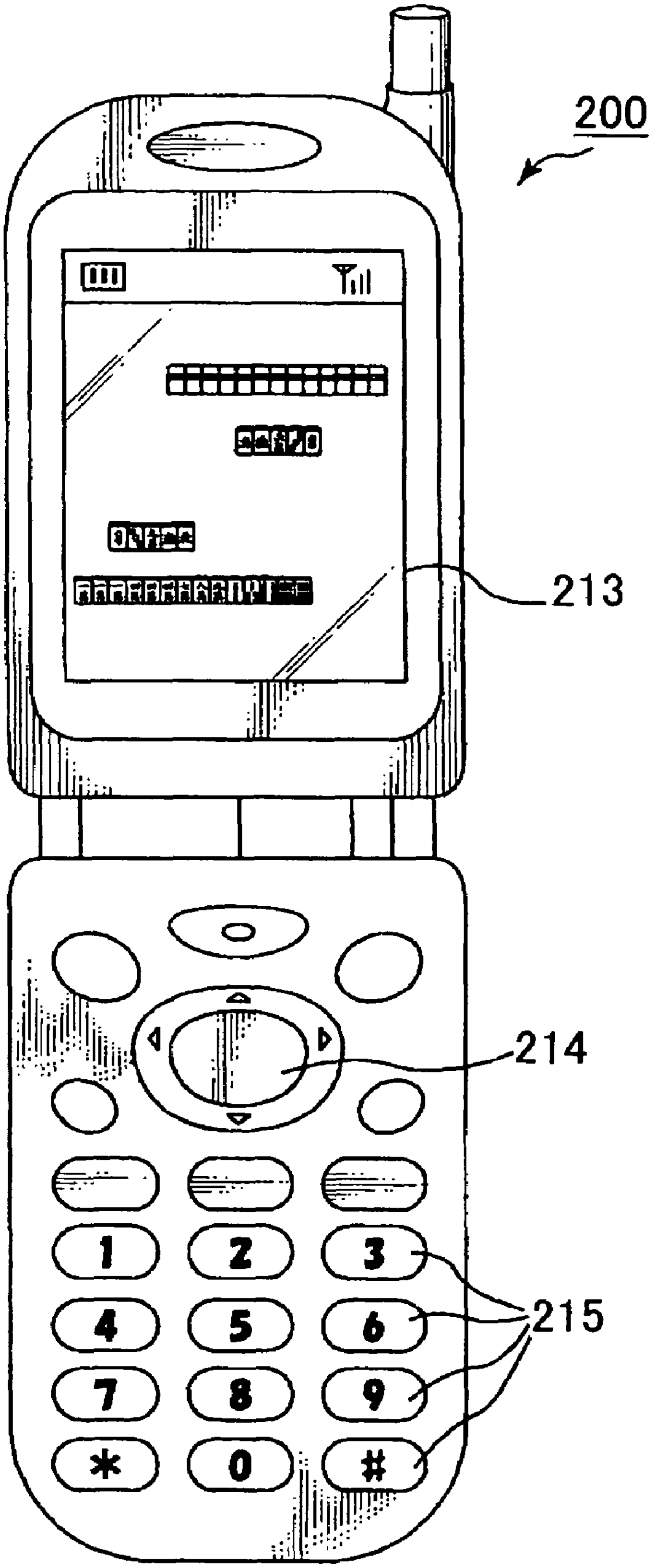
FIG. 15 is a schematic front view showing a cellular phone according to a second embodiment.

FIG. 15 is a schematic front view showing the cellular phone according to the second embodiment.

A display device 213 provided on a cellular phone 200 displays images showing 13 or 14 tiles owned by the player, tiles that have been discarded by the player, tiles owned by the opponent character, which are displayed face down, tiles that have been discarded by the opponent character, and so on. Images showing the player and opponent characters playing the mahjong game and so on may also be displayed on the display device 213.

The cellular phone 200 also comprises an operating button 214 serving as operating means and twelve operating buttons 215. By operating the operating button 214, for example, the player selects an unnecessary tile from the tiles owned by the player, and by operating the operating buttons 215, the player performs operations to pick up and discard the tile, and so on. Thus the mahjong game can be advanced.

Figure 16:
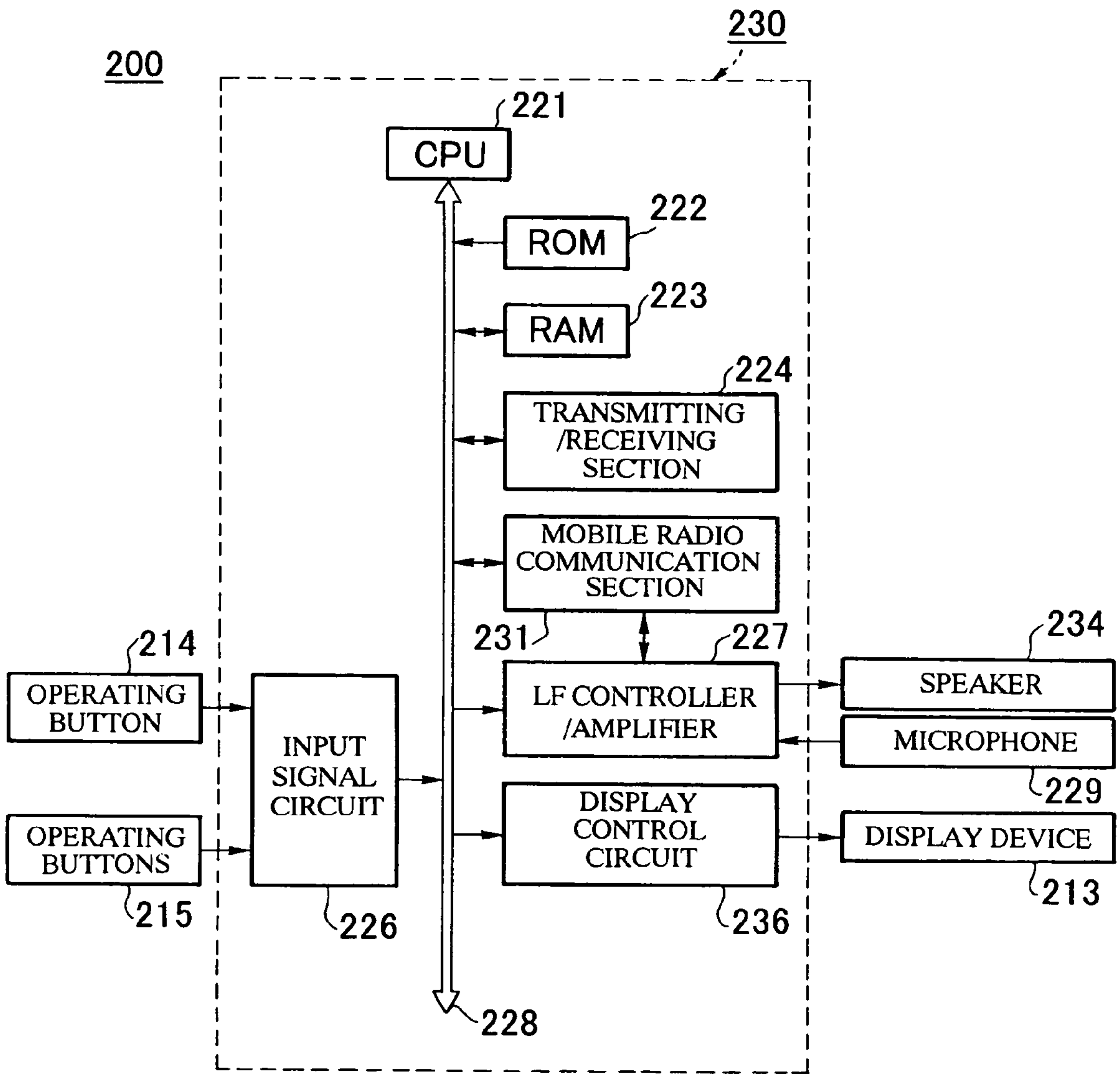
FIG. 16 is a schematic block diagram showing the inner configuration of the cellular phone shown in FIG. 15.

FIG. 16 is a schematic block diagram showing an example of the constitution of the cellular phone 200 shown in FIG. 15.

As shown in FIG. 16, a control section 230 is provided in the interior of the cellular phone 200. This control section 230 comprises a central processing unit (CPU) 221, a ROM 222, a RAM 223, a transmitting/receiving section 224, an input/output bus 228, an input signal circuit 226, an LF controller/amplifier 227, and a display control circuit 236.

The operating button 214 and operating buttons 215 are connected to the input signal circuit 226. Further, the input signal circuit 226 is connected to the CPU 221 via the input/output bus 228. The ROM 222 and RAM 223 are also connected to the input/output bus 228.

Various types of image data, such as image data for the tiles and opponent characters, including unselected opponent characters, displayed on the display device 213, image data for the appearance and the speech of the opponent characters, image data for displaying images of the predetermined conditions for increasing the number of opponent characters or for enabling the player to select predetermined items, and so on are stored in the ROM 222 together with the mahjong game machine control program, which controls the overall flow of the mahjong game, a program for creating a ranking list on the basis of various data obtained during a mahjong game, and so on. The ROM 222 also stores a table listing a plurality of ranking criteria, and a plurality of items of attraction image data serving as attraction data for each opponent character. The attraction data include image data for presenting attractions prior to a game with an opponent character, image data for presenting attractions when a game has been won or lost against an opponent character, sound data, and so on. Note that images of the opponent characters, images of the speech of the opponent characters, background images, and so on may be stored separately and combined on the display device 213 to form a single screen.

The RAM 234 stores various types of selection data and game data. The game data include information concerning the winner and loser in a game against the opponent character, the points acquired by the player in the game against the opponent character, the number of times the opponent character completed hands, and so on. The selection data indicate the result of a selection of the ranking type, for example.

The transmitting/receiving section 224 is also connected to the input/output bus 228. The transmitting/receiving section 224 is used to perform communication with an external device via the Internet. A mobile radio communication section 231 and the LF controller/amplifier 227 are also connected to the input/output bus 228, and a speaker 234 and a microphone 229 are connected to the LF controller/amplifier 227. The mobile radio communication section 231 comprises an antenna and the like, and thus transmits calling signals, receives incoming call signals, transmits and receives voice signals during a call, and so on.

The display control circuit 236 is also connected to the input/output bus 228. The display device 213 is connected to the display control circuit 236, and hence the display control circuit 236 supplies the display device 213 with display signals corresponding to the results of calculation processing performed in the CPU 221.

In the mahjong game machine described above, it is rather difficult to form a national wide network, but with a cellular phone, it is comparatively easy to construct a national wide network between a server (information processing device) and cellular phones by way of a wireless network, and hence a national ranking list can be displayed comparatively easily.

With a cellular phone, it is also possible to transmit the obtained ranking list to another person in order to boast about the results.

When a ranking list is displayed on a cellular phone, the providers of competing web sites can be prevented from discovering the number of users of this web site by limiting the ranking list to the top 100 players. In this case, players outside the top 100 may be displayed according to predetermined ranks (rank D, rank E, and so on).

Likewise with a cellular phone, a player may be presented with a specific image or allocated special points after winning a game, completing a hand in a specific way, or achieving extremely good results upon display of the ranking list. When these points reach a fixed value, a bonus or image may be awarded as a present. When a normally unobtainable image is received as a result of completing a hand in a specific way, this may be used as proof that the player completed a hand in the specific way, and hence the player can boast about this to other people.

In the cellular phone 200 according to the second embodiment, the various programs, attraction image data, set data, and so on (also referred to as "programs and the like" below) may be stored in the ROM 222 and so on in advance. Alternatively, the external server (information processing device) may be accessed by the cellular phone to request the transmission of these programs and the like, whereby the programs and the like are transmitted from the server and so on, and thus received and stored.

Also according to the present invention, a constitution is possible whereby the program for controlling the mahjong game and the program for displaying the various images are stored in the cellular phone 200 in advance, whereas the various required image data and the like are transmitted from the server and so on as the mahjong game progresses. Alternatively, the various programs and image data stored in the server and so on may be supplied to the cellular phone from the server and so on, whereupon the supplied programs are executed in the cellular phone 200.

Further, when the various programs and image data are to be updated in the server and so on, a notification signal indicating this may be transmitted to the cellular phone 200. After receiving the notification signal, the cellular phone accesses the server and so on to receive and store the various updated programs and image data. By means of such a constitution, the mahjong game can always be played on the basis of the newest programs and the like.

According to this embodiment, the ranking criterion changes at fixed time intervals, and hence the ranking system, which tends to be fixed, can be provided with fluidity. Moreover, ranking lists are displayed on the basis of various ranking criteria, and hence a player's mahjong skills can be evaluated from various perspectives, enabling the player to be ranked highly when the ranking criterion changes to a manner of winning (a skill) which the player performs well. Furthermore, the winning method changes according to the ranking criterion, and hence the player can sufficiently enjoy the mahjong game over a long period of time without becoming bored.

What is claimed is:

1. A mahjong game system constituted by a mahjong game machine comprising a display device for displaying at least an image of tiles owned by a player and tiles that have been discarded by the player, and an image of tiles that have been discarded by an opponent character serving as an opponent in a game, said mahjong game machine thus providing a two-player mahjong game in which said player plays against a plurality of said opponent characters respectively, and an information processing device which is capable of transmitting and receiving data to and from said mahjong game machine, wherein said information processing device comprises:

a game data reception device which receives game data transmitted by said mahjong game machine;

a game data storage device which stores said game data received by said game data reception device;

a ranking criterion setting device which sets a ranking criterion at predetermined time intervals during creation of a ranking list based on said game data;

a ranking device which creates, on a basis of said ranking criterion set by said ranking criterion setting device, a ranking list based on said game data stored by said game data storage device;

a ranking data transmission device which transmits ranking data ranked by said ranking device to said mahjong game machine; and wherein said ranking criterion setting device selects and sets a single ranking criterion from among a plurality of ranking criteria by conducting a sampling of said ranking data at predetermined time intervals.

2. The mahjong game system according to claim 1, wherein said information processing device is connected to a plurality of said mahjong game machines via a wired or wireless network.

3. The mahjong game system according to claim 1, wherein said mahjong game machine is one of a gaming machine disposed in a game arcade, a home gaming machine, a portable gaming machine, and a gaming machine installed in a cellular phone.

4. The mahjong game system according to claim 1, wherein said ranking criterion is at least one of a number of victories, a winning percentage, a number of points acquired in one game period Hanchan, a number of consecutive wins achieved by reducing the score of an opponent character to zero, and a number of rounds required from a beginning of the game to reduce a score of an opponent to zero.

5. The mahjong game system according to claim 1, wherein said game data are at least one of win/loss data, data regarding a score obtained by said player or said opponent character, and data regarding a number of times or the timing said player or said opponent character has completed hands.

6. A mahjong ranking list display method which determines, on a basis of a predetermined ranking criterion, a ranking list based on game data of a mahjong game, and displays said ranking list, said method comprising the computer implemented steps of:

storing game data generated by a mahjong game machine during a game played against an opponent character;

transmitting said stored game result data to an information processing device;

receiving ranking data transmitted by said information processing device;

storing said received ranking data;

displaying said stored ranking data on a display device;

receiving said game data transmitted by said mahjong game machine in said information processing device;

storing said game data received from said mahjong game machine;

setting a ranking criterion at predetermined time intervals when a ranking list is to be created on the basis of said game data;

creating, on a basis of said set ranking criterion, a ranking list based on said stored game data;

transmitting said ranked ranking data to said mahjong game machine; and wherein the step of setting a ranking criterion at said predetermined time intervals when a ranking list is to be created on a basis of said game data is performed by selecting and setting a single ranking criterion from among a plurality of ranking criteria by conducting a sampling of said ranking data at predetermined time intervals.

7. The mahjong ranking list display method according to claim 6, wherein said information processing device is connected to a plurality of said mahjong game machines via a wired or wireless network.

8. The mahjong ranking list display method according to claim 6, wherein said mahjong game machine is one of a gaming machine disposed in a game arcade, a home gaming machine, a portable gaming machine, and a gaming machine installed in a cellular phone.

9. The mahjong ranking list display method according to claim 6, wherein said ranking criterion is at least one of the number of victories, a winning percentage, the number of points acquired in one game period Hanchan, consecutive wins achieved by reducing the score of an opponent character to zero, and a number of rounds required from the beginning of the game to reduce the score of an opponent to zero.

10. The mahjong ranking list display method according to claim 6, wherein said game data are at least one of win/loss data, data regarding a score obtained by said player or said opponent character, and data regarding a number of times or the timing said player or said opponent character has completed hands.

* * * * *